US010462728B2

(12) United States Patent
Zhao et al.

(10) Patent No.: US 10,462,728 B2
(45) Date of Patent: Oct. 29, 2019

(54) ACCESS CONTROL APPARATUS AND METHOD, AND ACCESS APPARATUS AND METHOD

(71) Applicant: Huawei Technologies Co., Ltd., Shenzhen, Guangdong (CN)

(72) Inventors: Yueying Zhao, Shanghai (CN); Zongjie Wang, Shanghai (CN); Xueli Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 15/392,879

(22) Filed: Dec. 28, 2016

(65) Prior Publication Data
US 2017/0111848 A1   Apr. 20, 2017

Related U.S. Application Data

(63) Continuation of application No. PCT/CN2014/081304, filed on Jun. 30, 2014.

(51) Int. Cl.
*H04W 4/00* (2018.01)
*H04W 48/02* (2009.01)
(Continued)

(52) U.S. Cl.
CPC ............ *H04W 48/02* (2013.01); *H04W 4/70* (2018.02); *H04W 72/0446* (2013.01); *H04W 74/0833* (2013.01); *H04W 74/002* (2013.01)

(58) Field of Classification Search
CPC .......................... H04W 48/02; H04W 74/0833
See application file for complete search history.

(56) References Cited

U.S. PATENT DOCUMENTS

2007/0140115 A1* 6/2007 Bienas ............... H04W 74/008
370/230
2008/0101313 A1* 5/2008 Choi ..................... H04W 72/06
370/342
(Continued)

FOREIGN PATENT DOCUMENTS

CN       102625460 A      8/2012
CN       102917433 A  *  10/2012
(Continued)

*Primary Examiner* — Chi H Pham
*Assistant Examiner* — Fahmida S Chowdhury
(74) *Attorney, Agent, or Firm* — Leydig, Voit & Mayer, Ltd.

(57) ABSTRACT

This application provides an access control apparatus and method, and an access apparatus and method. The access control apparatus includes: a receiving unit, configured to receive a first preamble sequence; a determining unit, configured to determine an acquired-terminal group; and a sending unit, configured to send a first acquisition indicator; where the receiving unit is further configured to receive a second preamble sequence, the determining unit is further configured to determine an acquired terminal, and the sending unit is further configured to send a second acquisition indicator, where the second acquisition indicator is used to indicate access of the acquired terminal. In the present invention, a process of contending for an access resource by a terminal transforms from one-phase contention to two-phase contention, so that a quantity of preamble sequences received by the base station each time can be greatly reduced, thereby effectively reducing load of the base station.

20 Claims, 6 Drawing Sheets

(51) Int. Cl.
*H04W 72/04* (2009.01)
*H04W 74/08* (2009.01)
*H04W 4/70* (2018.01)
*H04W 74/00* (2009.01)

(56) References Cited

U.S. PATENT DOCUMENTS

| | | | |
|---|---|---|---|
| 2008/0279257 | A1 | 11/2008 | Vujcic et al. |
| 2010/0041389 | A1* | 2/2010 | Cave .................... H04W 24/00 455/423 |
| 2010/0214984 | A1 | 8/2010 | Cho et al. |
| 2011/0199905 | A1* | 8/2011 | Pinheiro ........... H04W 28/0215 370/235 |
| 2012/0195258 | A1 | 8/2012 | Zhou et al. |
| 2012/0281530 | A1* | 11/2012 | Sambhwani ...... H04W 28/0284 370/230 |
| 2012/0281681 | A1 | 11/2012 | Hsu et al. |
| 2013/0155894 | A1 | 6/2013 | Li et al. |
| 2015/0092731 | A1* | 4/2015 | Aminaka .......... H04W 72/0406 370/329 |

FOREIGN PATENT DOCUMENTS

| | | | |
|---|---|---|---|
| CN | 102769831 | A | 11/2012 |
| CN | 102802270 | A | 11/2012 |
| CN | 102917433 | * | 2/2013 |
| CN | 102917433 | A | 2/2013 |
| EP | 1121823 | A1 | 8/2001 |
| KR | 10-2008-0066734 | A | 7/2008 |
| KR | 10-2010-0096347 | A | 9/2010 |
| WO | 0110158 | A1 | 2/2001 |
| WO | 2013009380 | A1 | 1/2013 |
| WO | 2013/035970 | A1 | 3/2013 |

* cited by examiner

ACCESS CONTROL APPARATUS AND METHOD, AND ACCESS APPARATUS AND METHOD

CROSS-REFERENCE TO RELATED APPLICATIONS

This application is a continuation of International Application No. PCT/CN2014/081304, filed on Jun. 30, 2014, the disclosure of which is hereby incorporated by reference in its entirety.

TECHNICAL FIELD

The present invention relates to the communications field, and in particular, to an access control apparatus and method, and an access apparatus and method.

BACKGROUND

A Machine-To-Machine (M2M) technology is a networked application and service that use a machine as a terminal and use intelligent interaction as a core. In the M2M technology, cooperative work between machines is implemented by using data transmission between the machines, which greatly improves productivity. With development of mobile communications technologies, M2M services represented by intelligent metering, vehicle condition monitoring, Internet of Vehicles, industrial monitoring, and the like gradually become popular application services.

Main characteristics of the M2M technology are as follows: numerous terminals; a small data packet service is used for communication between different terminals; and a discontinuous transmission manner is used for communication between different terminals, which has a low latency requirement. Therefore, a Universal Mobile Telecommunications System (UMTS) becomes a communications system generally used to implement the M2M technology. When different terminals communicate with each other, the UMTS is used for sending. In the UMTS, the small data packet service may work in a CELL_FACH mode of a Forward Access Channel (FACH) or in an enhanced CELL_FACH Radio Resource Control (RRC) connected mode, and a terminal may transmit data on a Random Access Channel (RACH). That is, when the terminal needs to transmit data, the terminal first applies for and uses an access resource of a network; after obtaining the access resource by means of applying, the terminal sends the data by using the access resource; after transmitting the data, the terminal releases the access resource. Therefore, the access resource of the UMTS can be efficiently used.

Because data is transmitted on a RACH, a terminal usually requests, in a manner of sending a preamble sequence, to use an access resource. Specifically, when the terminal needs to transmit data, the terminal first sends a preamble sequence at an access slot (AS) boundary. A base station detects preamble sequences, and when the preamble sequence sent by the terminal is detected and there is an available access resource, the base station sends an acquisition indicator (AI) to the terminal. If the terminal receives the AI within a preset time after sending the preamble sequence, the terminal sends the data within a particular time after receiving the AI. If the terminal receives no AI within a preset time after sending the preamble sequence, the terminal re-sends a preamble sequence at a next AS boundary and requests again to use an access resource.

However, if there are limited available RACH access resources and numerous M2M terminals, multiple terminals may simultaneously request to use an access resource. For example, in a vehicle condition monitoring system, at a particular moment, many vehicle-mounted terminals may simultaneously report vehicle condition data to a server. In this case, a base station may simultaneously receive preamble sequences sent by many terminals, which causes overload of the base station. Further, because a limited quantity of terminals are allowed to access a network at a same moment, many terminals cannot receive an AI within a preset time after sending preamble sequences; and many terminals that receive no AI may re-send preamble sequences to request again to use an access resource, which further aggravates the load of the base station.

SUMMARY

Embodiments of the present invention provide an access control apparatus and method, and an access apparatus and method, to resolve a problem that an existing access method causes overload of a base station.

According to a first aspect, the present invention provides an access control apparatus, where the apparatus includes: a receiving unit, configured to receive a first preamble sequence sent by a leader terminal in a terminal group; a determining unit, configured to determine an acquired-terminal group according to the first preamble sequence received by the receiving unit; and a sending unit, configured to send a first acquisition indicator to a terminal in the acquired-terminal group that is determined by the determining unit; where the receiving unit is further configured to receive a second preamble sequence that is sent by the terminal in the acquired-terminal group after receiving the first acquisition indicator sent by the sending unit; the determining unit is further configured to determine an acquired terminal according to the second preamble sequence received by the receiving unit; and the sending unit is further configured to send a second acquisition indicator to the acquired terminal determined by the determining unit, where the second acquisition indicator is used to indicate access of the acquired terminal.

With reference to the first aspect, in a first possible implementation manner of the first aspect, that a receiving unit is configured to receive a first preamble sequence sent by a leader terminal in a terminal group includes: the receiving unit is configured to receive the first preamble sequence that is sent by the leader terminal by using a physical random access channel PRACH and that includes a group identifier of the terminal group.

With reference to the first possible implementation manner of the first aspect, in a second possible implementation manner of the first aspect, that a sending unit is configured to send a first acquisition indicator to a terminal in the acquired-terminal group that is determined by the determining unit includes: the sending unit is configured to send, by using an acquisition indicator channel AICH, the first acquisition indicator that includes a group identifier of the acquired group.

With reference to the first possible implementation manner of the first aspect or the second possible implementation manner of the first aspect, in a third possible implementation manner of the first aspect, that the receiving unit is further configured to receive a second preamble sequence that is sent by the terminal in the acquired-terminal group after receiving the first acquisition indicator sent by the sending unit includes: the receiving unit is further configured to receive the second preamble sequence that is sent by the terminal in the acquired group by using the PRACH after receiving the first acquisition indicator and that includes a signature sequence of the terminal.

With reference to the first possible implementation manner of the first aspect, the second possible implementation manner of the first aspect, or the third possible implementation manner of the first aspect, in a fourth possible implementation manner of the first aspect, that the sending unit is further configured to send a second acquisition indicator to the acquired terminal determined by the determining unit includes: the sending unit is further configured to send, by using the AICH, the second acquisition indicator that includes a signature sequence of the acquired terminal.

According to a second aspect, the present invention further provides an access apparatus, where the apparatus includes: a receiving unit, configured to receive a first acquisition indicator that is sent by a base station and that includes a group identifier of an acquired group; and a sending unit, configured to send a second preamble sequence that includes a signature sequence of a terminal to the base station when the group identifier of the acquired group received by the receiving unit is consistent with a group identifier of a terminal group in which the terminal is located; where the receiving unit is further configured to receive a second acquisition indicator that is sent by the base station after determining an acquired terminal according to the second preamble sequence and that includes a signature sequence of the acquired terminal; and the sending unit is further configured to send data to the base station when the signature sequence of the acquired terminal received by the receiving unit is consistent with the signature sequence of the terminal.

With reference to the second aspect, in a first possible implementation manner of the second aspect, that a receiving unit is configured to receive a first acquisition indicator that is sent by a base station and that includes a group identifier of an acquired group includes: the receiving unit is configured to receive the first acquisition indicator by using an acquisition indicator channel AICH.

With reference to the second aspect, in a second possible implementation manner of the second aspect, the apparatus further includes: a generation unit, configured to generate the first preamble sequence that includes the group identifier of the terminal group; the sending unit is further configured to send the first preamble sequence by using a physical random access channel PRACH; and that a receiving unit is configured to receive a first acquisition indicator that is sent by a base station and that includes a group identifier of an acquired group includes: the receiving unit is configured to receive the first acquisition indicator by using an AICH, where the first acquisition indicator is sent by the base station after determining the acquired group according to the first preamble sequence.

With reference to the second possible implementation manner of the second aspect, in a third possible implementation manner of the second aspect, the generation unit includes: a determining subunit, configured to determine the group identifier of the terminal group and the signature sequence of the terminal, where the group identifier of the terminal group is a Hadamard sequence of a preset length; and a generation subunit, configured to generate the first preamble sequence including the group identifier of the terminal group and the signature sequence of the terminal.

With reference to the second possible implementation manner of the second aspect or the third possible implementation manner of the second aspect, in a fourth possible implementation manner of the second aspect, the sending unit is further configured to re-send the first preamble sequence to the base station when the signature sequence of the acquired terminal is inconsistent with the signature sequence of the terminal.

According to a third aspect, the present invention further provides an access control method, where the method includes: receiving a first preamble sequence sent by a leader terminal in a terminal group; determining an acquired-terminal group according to the first preamble sequence; sending a first acquisition indicator to a terminal in the acquired-terminal group; receiving a second preamble sequence that is sent by a terminal in the terminal group after receiving the first acquisition indicator; determining an acquired terminal according to the second preamble sequence; and sending a second acquisition indicator to the acquired terminal, where the second acquisition indicator is used to indicate access of the acquired terminal.

With reference to the third aspect, in a first possible implementation manner of the third aspect, the receiving a first preamble sequence sent by a leader terminal in a terminal group includes: receiving the first preamble sequence that is sent by the leader terminal by using a physical random access channel PRACH and that includes a group identifier of the terminal group.

With reference to the first possible implementation manner of the third aspect, in a second possible implementation manner of the third aspect, the sending a first acquisition indicator to a terminal in the acquired-terminal group includes: sending, by using an acquisition indicator channel AICH, the first acquisition indicator that includes a group identifier of the acquired group.

With reference to the first possible implementation manner of the third aspect or the second possible implementation manner of the third aspect, in a third possible implementation manner of the third aspect, the receiving a second preamble sequence that is sent by the terminal in the acquired-terminal group after receiving the first acquisition indicator includes: receiving the second preamble sequence that is sent by the terminal in the acquired group by using the PRACH after receiving the first acquisition indicator and that includes a signature sequence of the terminal.

With reference to the first possible implementation manner of the third aspect, the second possible implementation manner of the third aspect, or the third possible implementation manner of the third aspect, in a fourth possible implementation manner of the third aspect, the sending a second acquisition indicator to the acquired terminal includes: sending, by using the AICH, the second acquisition indicator that includes a signature sequence of the acquired terminal.

According to a fourth aspect, the present invention further provides an access method, where the method includes: receiving a first acquisition indicator that is sent by a base station and that includes a group identifier of an acquired group; sending a second preamble sequence that includes a signature sequence of a terminal to the base station if the group identifier of the acquired group is consistent with a group identifier of a terminal group in which the terminal is located; receiving a second acquisition indicator that is sent by the base station after determining an acquired terminal according to the second preamble sequence and that includes a signature sequence of the acquired terminal; and sending data to the base station if the signature sequence of the acquired terminal is consistent with the signature sequence of the terminal.

With reference to the fourth aspect, in a first possible implementation manner of the fourth aspect, the receiving a first acquisition indicator that is sent by a base station and that includes a group identifier of an acquired group includes: receiving the first acquisition indicator by using an acquisition indicator channel AICH, where the first acquisition indicator is sent by the base station after determining the acquired group according to a first preamble sequence, and the first preamble sequence is sent by a leader terminal in the terminal group by using a physical random access channel PRACH.

With reference to the fourth aspect, in a second possible implementation manner of the fourth aspect, before the receiving a first acquisition indicator that is sent by a base station and that includes a group identifier of an acquired group, the method further includes: generating the first preamble sequence that includes the group identifier of the terminal group, and sending the first preamble sequence by using a PRACH; and the receiving a first acquisition indicator that is sent by a base station and that includes a group identifier of an acquired group includes: receiving the first acquisition indicator by using an AICH, where the first acquisition indicator is sent by the base station after determining the acquired group according to the first preamble sequence.

With reference to the second possible implementation manner of the fourth aspect, in a third possible implementation manner of the fourth aspect, the generating the first preamble sequence that includes the group identifier of the terminal group includes: determining the group identifier of the terminal group and the signature sequence of the terminal, where the group identifier of the terminal group is a Hadamard sequence of a preset length; and generating the first preamble sequence including the group identifier of the terminal group and the signature sequence of the terminal.

With reference to the second possible implementation manner of the fourth aspect or the third possible implementation manner of the fourth aspect, in a fourth possible implementation manner of the fourth aspect, the method further includes: re-sending the first preamble sequence to the base station if the signature sequence of the acquired terminal is inconsistent with the signature sequence of the terminal.

In the embodiments of the present invention, a receiving unit is configured to receive a first preamble sequence sent by a leader terminal in a terminal group; a determining unit is configured to determine an acquired-terminal group according to the first preamble sequence received by the receiving unit; a sending unit is configured to send a first acquisition indicator to a terminal in the acquired-terminal group determined by the determining unit; the receiving unit is further configured to receive a second preamble sequence that is sent by the terminal in the acquired-terminal group after receiving the first acquisition indicator sent by the sending unit; the determining unit is further configured to determine an acquired terminal according to the second preamble sequence received by the receiving unit; and the sending unit is further configured to send a second acquisition indicator to the acquired terminal determined by the determining unit, where the second acquisition indicator is used to indicate access of the acquired terminal. A process of contending for an access resource by a terminal transforms from one-phase contention to two-phase contention, and each time a base station receives only a first preamble sequence sent by each group leader or a second preamble sequence sent by a terminal in an acquired group, so that a quantity of preamble sequences received by the base station each time can be greatly reduced, thereby effectively reducing load of the base station.

BRIEF DESCRIPTION OF THE DRAWINGS

To describe the technical solutions in the embodiments of the present invention more clearly, the following briefly describes the accompanying drawings required for describing the embodiments. Apparently, a person of ordinary skill in the art may still derive other drawings from these accompanying drawings without creative efforts.

DETAILED DESCRIPTION

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In a method described in the embodiments of the present invention, all terminals that need to access a target base station may be grouped into several terminal groups according to a preset grouping rule. Optionally, the preset grouping rule may be: terminals transmitting a same type of data are used as one terminal group; or terminals located in a same geographic area are used as one terminal group; or terminal groups are set during network planning. One terminal is selected from each terminal group according to a preset selection rule as a leader terminal in the terminal group. Optionally, the preset selection rule may be: any terminal is selected as a leader terminal in a terminal group; or a leader terminal is selected according to channel environments of terminals; or a leader terminal is set during network planning. According to different grouping manners, a terminal group may include only a leader terminal, or may further include at least one member terminal in addition to a leader terminal. Each terminal group has a unique corresponding group identifier, and each terminal also has a corresponding signature sequence.

In the following, an access control apparatus in the present invention is first described. Optionally, the access control apparatus may be disposed in a base station.

Figure 1:
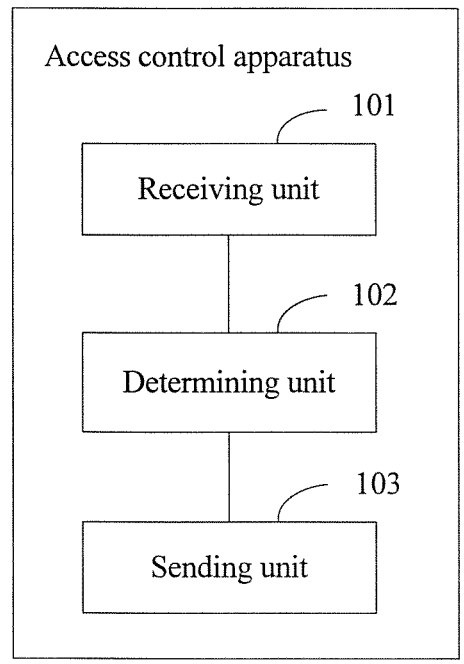
FIG. 1 is a schematic diagram of an embodiment of an access control apparatus according to the present invention.

FIG. 1 is a schematic diagram of an embodiment of an access control apparatus according to the present invention.

As shown in FIG. 1, the access control apparatus includes a receiving unit 101, a determining unit 102, and a sending unit 103.

The receiving unit 101 is configured to receive a first preamble sequence sent by a leader terminal in a terminal group.

In an optional manner, before a terminal in the terminal group transmits data, the leader terminal in the terminal group in which the terminal is located first sends the first preamble sequence by using a Physical Random Access Channel (PRACH), to contend for an access resource for the terminal in the terminal group. The receiving unit 101 receives the first preamble sequence. The first preamble sequence may include a group identifier of the terminal group. In an optional manner, the first preamble sequence may include a signature sequence of the leader terminal and the group identifier of the terminal group. The signature sequence of the leader terminal may be a preset sequence whose length is 16 bits. The group identifier of the terminal group may include a Hadamard (Hadamard) sequence whose length is N bit, where N is greater than 0, and a length of N is determined by a quantity of terminal groups and a quantity of terminals in the terminal group. In the prior art, a length of a preamble sequence is generally 4096 bits. Therefore, N further needs to meet a requirement that 4096 can be exactly divided by 16+N. A sequence of 16+N bits is repeated M times, and a first preamble sequence of 4096 bits may be formed, where M is a quotient obtained after 4096 is exactly divided by (16+N). For example, a group identifier of 16 bits may be repeatedly added to a signature sequence of 16 bits of the leader terminal for 128 times, to form the first preamble sequence of 4096 bits.

The determining unit 102 is configured to determine an acquired-terminal group according to the first preamble sequence received by the receiving unit 101.

The receiving unit 101 may receive one or more first preamble sequences within a particular time. When the receiving unit 101 receives only one first preamble sequence, and a terminal in a terminal group corresponding to the first preamble sequence can perform access, the determining unit 102 may determine the terminal group corresponding to the first preamble sequence as the acquired group. When a base station receives multiple first preamble sequences, optionally, the determining unit 102 may select a terminal group corresponding to one of the first preamble sequences as the acquired group according to a preset determining rule such as a receiving signal-to-noise ratio of the first preamble sequence.

The sending unit 103 is configured to send a first acquisition indicator to a terminal in the acquired-terminal group determined by the determining unit 102.

After the acquired group is determined, the sending unit 103 obtains a group identifier of the acquired group from the first preamble sequence, and then generates and sends the first acquisition indicator that includes the group identifier of the acquired group. The sending unit 103 may send the first acquisition indicator to each terminal by using an AICH. When sending the group identifier by using the AICH, the sending unit 103 may send the group identifier by setting the group identifier on 1024 chips reserved on the AICH. In an optional manner, each bit of the group identifier that is of the acquired group and whose length is N bits may be repeated, to form a sequence whose length is 2N bits, and then the group identifier of the acquired group is sent by using a spreading factor and a modulation scheme that are the same as those of an existing AICH.

The receiving unit 101 is further configured to receive a second preamble sequence that is sent by a terminal in the terminal group after receiving the first acquisition indicator sent by the sending unit 103.

Because there may be multiple terminals in the acquired group that need to perform access, the terminal in the acquired group also needs to contend for an access resource. The terminal in the acquired group may contend for the access resource in a manner of sending the second preamble sequence, where the second preamble sequence includes a signature sequence of the terminal. The receiving unit 101 receives a second preamble sequence sent by each terminal.

The determining unit 102 is further configured to determine an acquired terminal according to the second preamble sequence received by the receiving unit 101.

A process of determining the acquired terminal by the determining unit 102 according to the second preamble sequence is similar to a method in the prior art for determining, according to a preamble sequence, a terminal that can perform access, and is not described herein.

The sending unit 103 is further configured to send a second acquisition indicator to the acquired terminal determined by the determining unit 102, where the second acquisition indicator is used to indicate access of the acquired terminal.

In an optional manner, after the acquired terminal is determined, the sending unit 103 sends, by using the AICH, the second acquisition indicator that includes a signature sequence of the acquired terminal. A method for sending the second acquisition indicator is similar to a method for sending an acquisition indicator in the prior art, and is not described herein. When the acquired terminal receives the second acquisition indicator, and after a preset time interval, the acquired terminal sends, by using the PRACH, data that needs to be sent. The base station receives the data that is sent by the acquired terminal by using the PRACH. A specific process is similar to a terminal access method in the prior art, and is not described herein.

It can be learned from the foregoing embodiment that the access control apparatus may receive a first preamble sequence sent by a leader terminal in a terminal group, determine an acquired-terminal group according to the first preamble sequence, send a first acquisition indicator to a terminal in the acquired-terminal group, receive a second preamble sequence that is sent by a terminal in the terminal group after receiving the first acquisition indicator, determine an acquired terminal according to the second preamble sequence, and send a second acquisition indicator to the acquired terminal, where the second acquisition indicator is used to indicate access of the acquired terminal. According to this embodiment, a process of contending for an access resource by a terminal transforms from one-phase contention to two-phase contention. Therefore, not only a total quantity of preamble sequences received by a base station is reduced, but also a maximum quantity of preamble sequences that may be simultaneously received by the base station can be reduced, which can effectively reduce load of the base station. Accordingly, for each member terminal, if a quantity of preamble sequence sending times is reduced, energy consumed in a data transmission process can also be reduced.

In the following, an access apparatus corresponding to an access control apparatus is described. Optionally, the access apparatus may be disposed in a terminal.

Figure 2A:
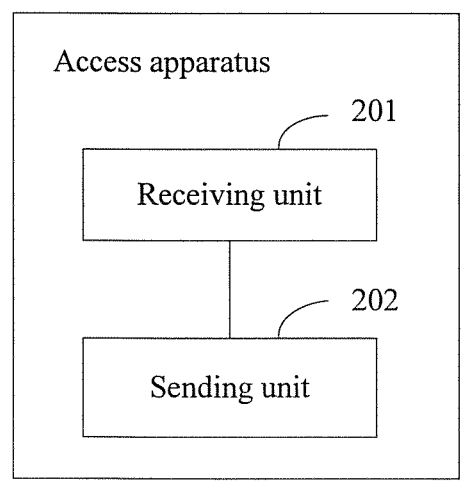
FIG. 2A is a schematic diagram of an embodiment of an access apparatus according to the present invention.

FIG. 2A is a schematic diagram of an embodiment of an access apparatus according to the present invention.

As shown in FIG. 2A, if the access apparatus is used for access of a member terminal, the access apparatus includes a receiving unit 201 and a sending unit 202.

The receiving unit 201 is configured to receive a first acquisition indicator that is sent by a base station and that includes a group identifier of an acquired group.

In an optional manner, the receiving unit 201 may directly receive the first acquisition indicator by using an AICH, where the first acquisition indicator is generated and sent by the base station after the base station determines the acquired group according to a first preamble sequence sent by a leader terminal in a terminal group in which the terminal is located.

The sending unit 202 is configured to send a second preamble sequence that includes a signature sequence of the terminal to the base station when the group identifier of the acquired group received by the receiving unit 201 is consistent with a group identifier of the terminal group in which the terminal is located.

If the group identifier of the acquired group is consistent with the group identifier of the terminal group, it indicates that in a current data transmission slot, the terminal in the terminal group can transmit data. However, the terminal cannot determine whether there are other terminals that need to transmit data in the terminal group in which the terminal is located, and to prevent a conflict, the terminal needs to contend for an access resource with other member terminals in the terminal group in which the terminal is located. Therefore, the sending unit 202 needs to send the second preamble sequence to contend for the access resource.

If the group identifier of the acquired group is inconsistent with the group identifier of the terminal group, it indicates that in a current data transmission slot, no terminal in the terminal group can transmit data. In this case, the receiving unit 201 needs to wait to receive the first acquisition indicator again.

The receiving unit 201 is further configured to receive a second acquisition indicator that is sent by the base station after determining an acquired terminal according to the second preamble sequence sent by the sending unit 202 and that includes a signature sequence of the acquired terminal.

In an optional manner, the base station sends the second acquisition indicator by using the AICH, and the receiving unit 201 receives the second acquisition indicator. A specific process of sending the second acquisition indicator is described in the foregoing embodiment, and is not described herein again.

The sending unit 202 is further configured to send data to the base station when the signature sequence of the acquired terminal received by the receiving unit is consistent with the signature sequence of the terminal.

If the signature sequence of the acquired terminal is consistent with the signature sequence of the terminal, it indicates that the terminal successfully obtains the access resource by means of contention and can transmit data. After a preset period of time specified in a protocol expires, the sending unit 202 may send the data by using a PRACH.

Figure 2B:
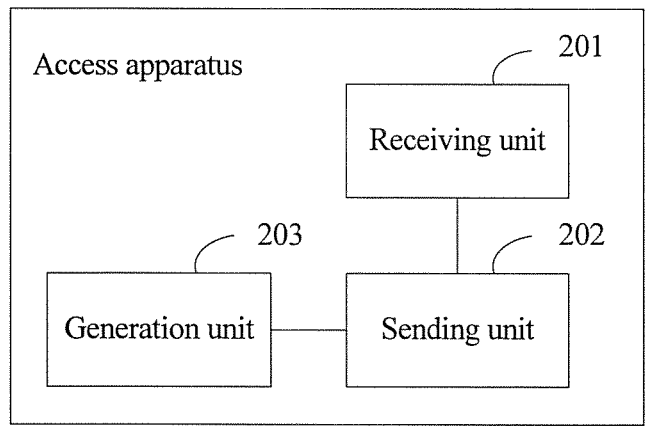
FIG. 2B is a schematic diagram of another embodiment of an access apparatus according to the present invention.

As shown in FIG. 2B, FIG. 2B is a schematic diagram of another embodiment of an access apparatus according to the present invention.

As shown in FIG. 2B, if the access apparatus is used to implement access of the leader terminal in the terminal group, the access apparatus further includes a generation unit 203 in addition to the receiving unit 201 and the sending unit 202.

The generation unit 203 is configured to generate the first preamble sequence that includes the group identifier of the terminal group.

When the terminal performs access, the generation unit 203 first generates the first preamble sequence, where the first preamble sequence may include the group identifier of the terminal group. In an optional manner, the first preamble sequence may include a signature sequence of the leader terminal and the group identifier of the terminal group. A structure and a generation manner that are of the first preamble sequence are described in the foregoing embodiment, and are not described herein again.

The sending unit 202 is further configured to send the first preamble sequence by using the PRACH.

After the first preamble sequence is generated, the sending unit 202 sends the first preamble sequence to the base station by using the PRACH, to contend for an access resource for all terminals in the terminal group.

The receiving unit 201 is further configured to receive the first acquisition indicator by using the AICH. Similarly, the first acquisition indicator is sent by the base station by using the AICH after determining the acquired group according to the first preamble sequence.

If the group identifier of the acquired group is inconsistent with the group identifier of the terminal group, it indicates that in a current data transmission slot, the terminal in the terminal group cannot transmit data. In this case, the sending unit 202 needs to send the first preamble sequence again, to contend for an access resource for the terminal in the terminal group. It should be noted herein that a sending time interval t for sending the first preamble sequence twice by the sending unit 202 needs to be greater than or equal to a sending time interval $t_{p\text{-}p,min}$ for sending preamble sequences that is specified in a protocol in an existing PRACH process. That is, $t_{P_p\text{-}P_p} \geq t_{p\text{-}p,min}$.

To improve a success rate of access resource contention, when sending the first preamble sequence again, the leader terminal may increase transmit power of the first preamble sequence. The leader terminal may continuously increase the transmit power and repeatedly send the first preamble sequence, until the group identifier of the acquired group is consistent with the group identifier of the terminal group or a maximum allowed quantity of transmission times is reached.

According to this embodiment, a process of contending for an access resource by a terminal transforms from one-phase contention to two-phase contention. Therefore, not only a total quantity of preamble sequences received by a base station is reduced, but also a maximum quantity of preamble sequences that may be simultaneously received by the base station can be reduced, which can effectively reduce load of the base station. Accordingly, for each member terminal, if a quantity of preamble sequence sending times is reduced, energy consumed in a data transmission process can also be reduced.

In the following, an access control method in the present invention is described. Optionally, a base station in a UTMS system may perform the access control method in the present invention.

Figure 3:
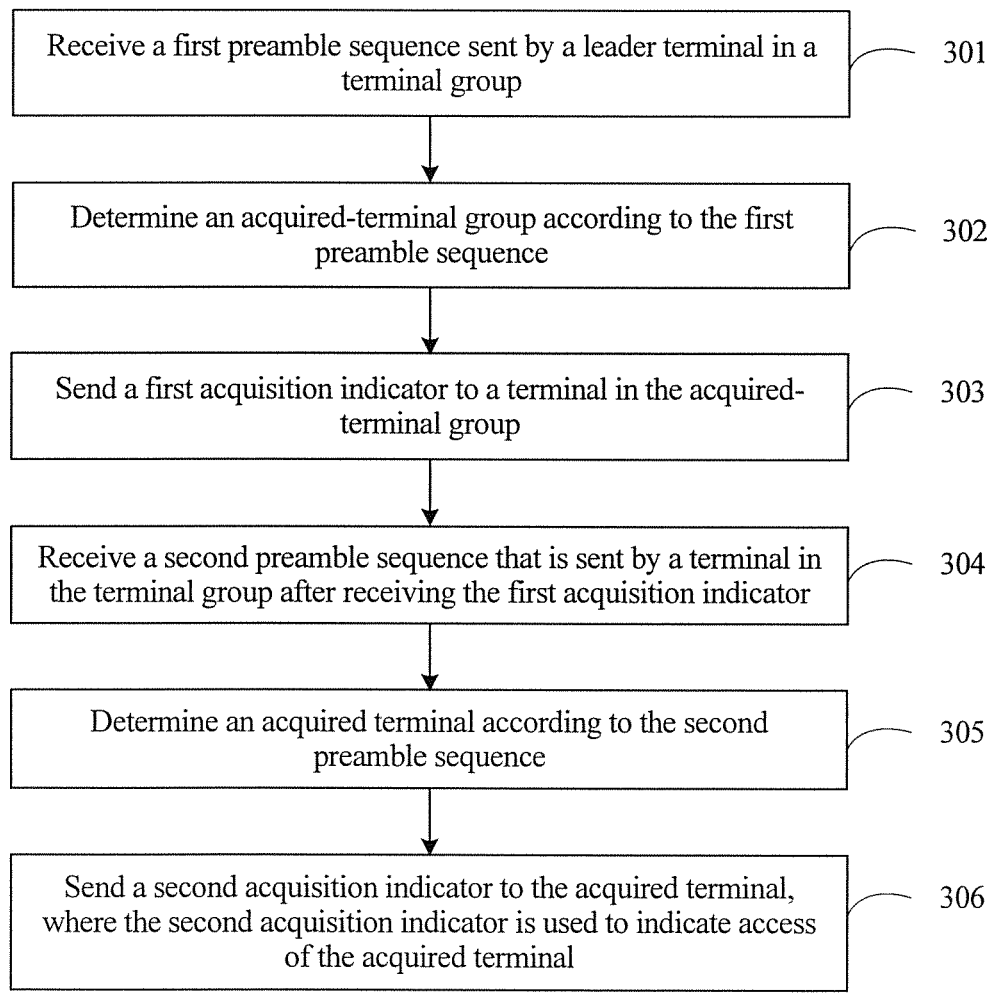
FIG. 3 is a flowchart of an embodiment of an access control method according to the present invention.

Referring to FIG. 3, FIG. 3 is a flowchart of an embodiment of an access control method according to the present invention.

Step 301: Receive a first preamble sequence sent by a leader terminal in a terminal group.

Before a terminal transmits data, the leader terminal in the terminal group in which the terminal is located first sends the first preamble sequence by using a PRACH, to contend for an access resource for the terminal. The first preamble sequence may include a group identifier of the terminal group. In actual use, the first preamble sequence may include a signature sequence of the leader terminal and the group identifier of the terminal group. A structure and a generation manner that are of the first preamble sequence are described in the foregoing embodiment, and are not described herein again.

Step 302: Determine an acquired group according to the first preamble sequence.

A base station may receive one or more first preamble sequences within a particular time. When the base station receives only one first preamble sequence, and the terminal in the terminal group can perform access, the terminal group corresponding to the first preamble sequence may be determined as the acquired group. When the base station receives multiple first preamble sequences, a terminal group corresponding to one of the first preamble sequences may be selected as the acquired group according to a preset determining rule such as a receiving signal-to-noise ratio of the first preamble sequence.

Step 303: Send a first acquisition indicator to a terminal in the acquired-terminal group.

After the acquired group is determined, the base station may first obtain a group identifier of the acquired group from the first preamble sequence sent by a leader terminal in the acquired group, and then generate the first acquisition indicator that includes the group identifier of the acquired group, and send the first acquisition indicator. The base station may send the first acquisition indicator to each terminal by using an AICH. When sending the first acquisition indicator by using the AICH, the base station may send the first acquisition indicator by placing the first acquisition indicator on 1024 chips reserved on the AICH. Specifically, each bit of the first preamble sequence whose length is N bits may be repeated, to form a sequence whose length is 2N bits, and then the sequence whose length is 2N bits is sent in a spreading manner by using OVSF code that is the same as that of an existing AICH and whose spreading factor is 1024/N.

An interval $t_{pp\text{-}ap}$ between a sending time of the first acquisition indicator and a sending time of the first preamble sequence needs to meet a preset time interval. For example, when a network parameter AICH_Transmission_Timing is set to 0, $t_{p\text{-}p,min}$=15360 chips, and $t_{pp\text{-}ap}$=7680 chips; and when the network parameter AICH_Transmission_Timing is set to 1, $t_{p\text{-}p,min}$=20480 chips, and $t_{pp\text{-}ap}$=12800 chips, where $t_{p\text{-}p,min}$ is a sending time interval for sending preamble sequences that is specified in a protocol in an existing PRACH process, and chips is a transmission time of each chip, and indicates a time required for transmitting one chip (chip).

Step 304: Receive a second preamble sequence that is sent by a terminal in the terminal group after receiving the first acquisition indicator.

Because there may be multiple terminals in the acquired group that need to perform access, the terminal in the acquired group also needs to contend for an access resource. The terminal in the acquired group may contend for the access resource in a manner of sending the second preamble sequence, where the second preamble sequence includes a signature sequence of the terminal. The base station receives a second preamble sequence sent by each terminal.

Step 305: Determine an acquired terminal according to the second preamble sequence.

A process of determining the acquired terminal by the base station according to the second preamble sequence is similar to a method in the prior art for determining, by a base station according to a preamble sequence, a terminal that can perform access, and is not described herein.

Step 306: Send a second acquisition indicator to the acquired terminal, where the second acquisition indicator is used to indicate access of the acquired terminal.

After determining the acquired terminal, the base station sends, by using the AICH, the second acquisition indicator that includes a signature sequence of the acquired terminal. A method for sending the second acquisition indicator is similar to a method for sending the first acquisition indicator, and is not described herein again. When the acquired terminal receives the second acquisition indicator, and after a preset time interval specified in a protocol, the acquired terminal sends, by using the PRACH, data that needs to be sent. The base station receives the data that is sent by the acquired terminal by using the PRACH. A specific process is similar to a data receiving method in the prior art, and is not described herein. It should be noted herein that the foregoing step 304 to step 306 are similar to a terminal random access process in the prior art. For details, refer to the terminal random access process in the prior art.

It can be learned from the foregoing embodiment that the access control apparatus may receive a first preamble sequence sent by a leader terminal in a terminal group, determine an acquired-terminal group according to the first preamble sequence, send a first acquisition indicator to a terminal in the acquired-terminal group, receive a second preamble sequence that is sent by a terminal in the terminal group after receiving the first acquisition indicator, determine an acquired terminal according to the second preamble sequence, and send a second acquisition indicator to the acquired terminal, where the second acquisition indicator is used to indicate access of the acquired terminal. According to this embodiment, a process of contending for an access resource by a terminal transforms from one-phase contention to two-phase contention. Therefore, not only a total quantity of preamble sequences received by a base station is reduced, but also a maximum quantity of preamble sequences that may be simultaneously received by the base station can be reduced, which can effectively reduce load of the base station. Accordingly, for each member terminal, if a quantity of preamble sequence sending times is reduced, energy consumed in a data transmission process can also be reduced.

In the following, an access method in the present invention is further described. The embodiment may be performed by a terminal in a terminal group.

Figure 4:
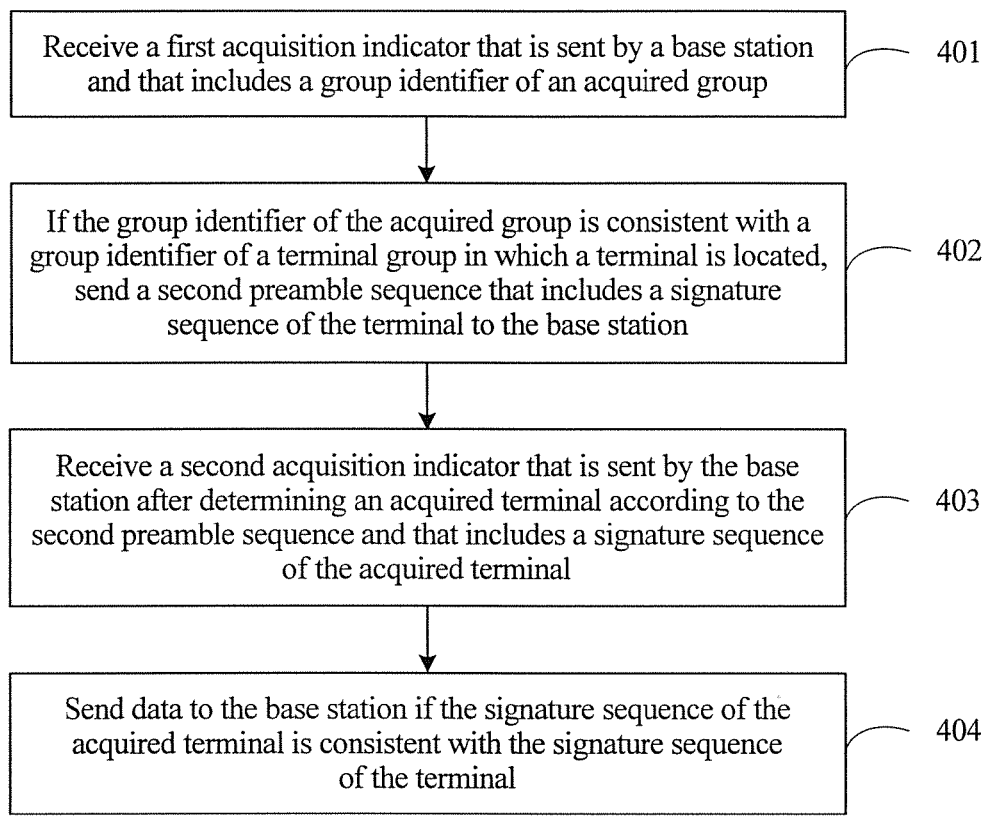
FIG. 4 is a flowchart of an embodiment of an access method according to the present invention.

Referring to FIG. 4, FIG. 4 is a flowchart of an embodiment of an access method of a terminal in a terminal group according to the present invention, and the method includes following steps.

Step 401: Receive a first acquisition indicator that is sent by a base station and that includes a group identifier of an acquired group.

If the terminal is a leader terminal in the terminal group, before the receiving a first acquisition indicator, the method further includes steps of contending for an access resource for a terminal in the terminal group: generating a first preamble sequence that includes a group identifier of the terminal group; and sending the first preamble sequence by using a PRACH. The first acquisition indicator is generated and sent by the base station after the base station determines the acquired group according to the first preamble sequence sent by the terminal. A specific process is described in the foregoing embodiment, and is not described herein again.

If the terminal is a member terminal in the terminal group, the first acquisition indicator may be directly received by using an AICH, where the first acquisition indicator is sent by the base station after determining the acquired group according to a first preamble sequence, and the first preamble sequence is sent by a leader terminal in the terminal group by using a PRACH.

Step 402: Send a second preamble sequence that includes a signature sequence of the terminal to the base station if the group identifier of the acquired group is consistent with a group identifier of the terminal group in which the terminal is located.

If the group identifier of the acquired group is consistent with the group identifier of the terminal group, it indicates that in a current data transmission slot, the terminal in the terminal group can transmit data. However, because the terminal cannot determine whether there are other terminals that need to transmit data in the terminal group, and to prevent a conflict, the terminal needs to contend for an access resource with other member terminals in the terminal group. A manner of contending for the access resource is to send the second preamble sequence.

When the terminal sends the second preamble sequence, a time interval $t_{ap\text{-}p}$ between starting to receive the first acquisition indicator and sending the second preamble sequence may meet: $t_{ap\text{-}p}=7680+i\times5120$ chips, where a value of i is 0, 1, 2, . . . .

If the group identifier of the acquired group is inconsistent with the group identifier of the terminal group, it indicates that in a current data transmission slot, the terminal in the terminal group cannot transmit data. In this case, the leader terminal needs to send the first preamble sequence again, to contend for an access resource for the terminal in the terminal group.

Step 403: Receive a second acquisition indicator that is sent by the base station after determining an acquired terminal according to the second preamble sequence and that includes a signature sequence of the acquired terminal.

After determining the acquired terminal, the base station may send the second acquisition indicator by using the AICH, and the terminal receives the second acquisition indicator. A specific form and a sending manner that are of the second acquisition indicator are described in the foregoing embodiment, and are not described herein again.

Step 404: Send data to the base station if the signature sequence of the acquired terminal is consistent with the signature sequence of the terminal.

If the signature sequence of the acquired terminal is consistent with the signature sequence of the terminal, it indicates that the terminal successfully obtains the access resource by means of contention and can transmit data. After a preset period of time expires, the data is sent by using the PRACH.

If the signature sequence of the acquired terminal is inconsistent with the signature sequence of the terminal, it indicates that the terminal fails to contend for the access resource, and the leader terminal needs to contend for the access resource for the terminal in the terminal group again.

It can be learned from the foregoing embodiment that, according to this embodiment, a process of contending for an access resource by a terminal transforms from one-phase contention to two-phase contention. Therefore, a quantity of preamble sequences received by a base station can be greatly reduced, thereby effectively reducing load of the base station.

In the following, an access method in the present invention is further described from a perspective of a member terminal in a terminal group.

Figure 5:
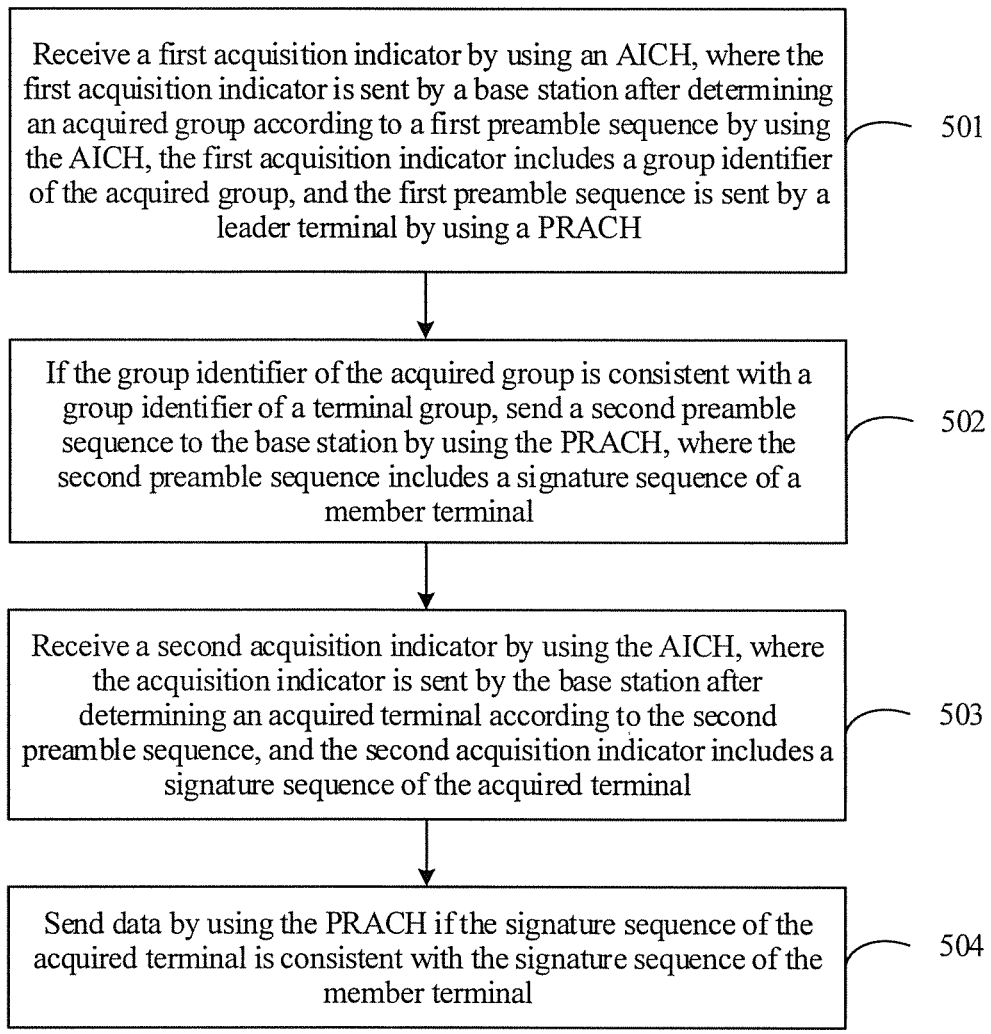
FIG. 5 is a flowchart of another embodiment of an access method according to the present invention.

Referring to FIG. 5, FIG. 5 is a flowchart of another embodiment of an access method according to the present invention, and the method includes following steps.

Step 501: Receive a first acquisition indicator by using an AICH, where the first acquisition indicator is sent by a base station after determining an acquired group according to a first preamble sequence, and the first preamble sequence is sent by a leader terminal in the terminal group by using a PRACH.

Step 502: If a group identifier of the acquired group is consistent with a group identifier of the terminal group, send a second preamble sequence to the base station by using the PRACH, where the second preamble sequence includes a signature sequence of the member terminal.

Step 503: Receive a second acquisition indicator by using the AICH, where the second acquisition indicator is sent by the base station after determining an acquired terminal according to the second preamble sequence, and the second acquisition indicator includes a signature sequence of the acquired terminal.

Step 504: Send data by using the PRACH if the signature sequence of the acquired terminal is consistent with the signature sequence of the member terminal.

It can be learned from the foregoing embodiment that, according to this embodiment, a process of contending for an access resource by a terminal transforms from one-phase contention to two-phase contention. Therefore, a quantity of preamble sequences received by a base station can be greatly reduced, thereby effectively reducing load of the base station. In addition, for each member terminal, if a quantity of preamble sequence sending times is reduced, energy consumed in a data transmission process can also be reduced.

In the following, an access method in the present invention is further described from a perspective of a leader terminal in a terminal group.

Figure 6:
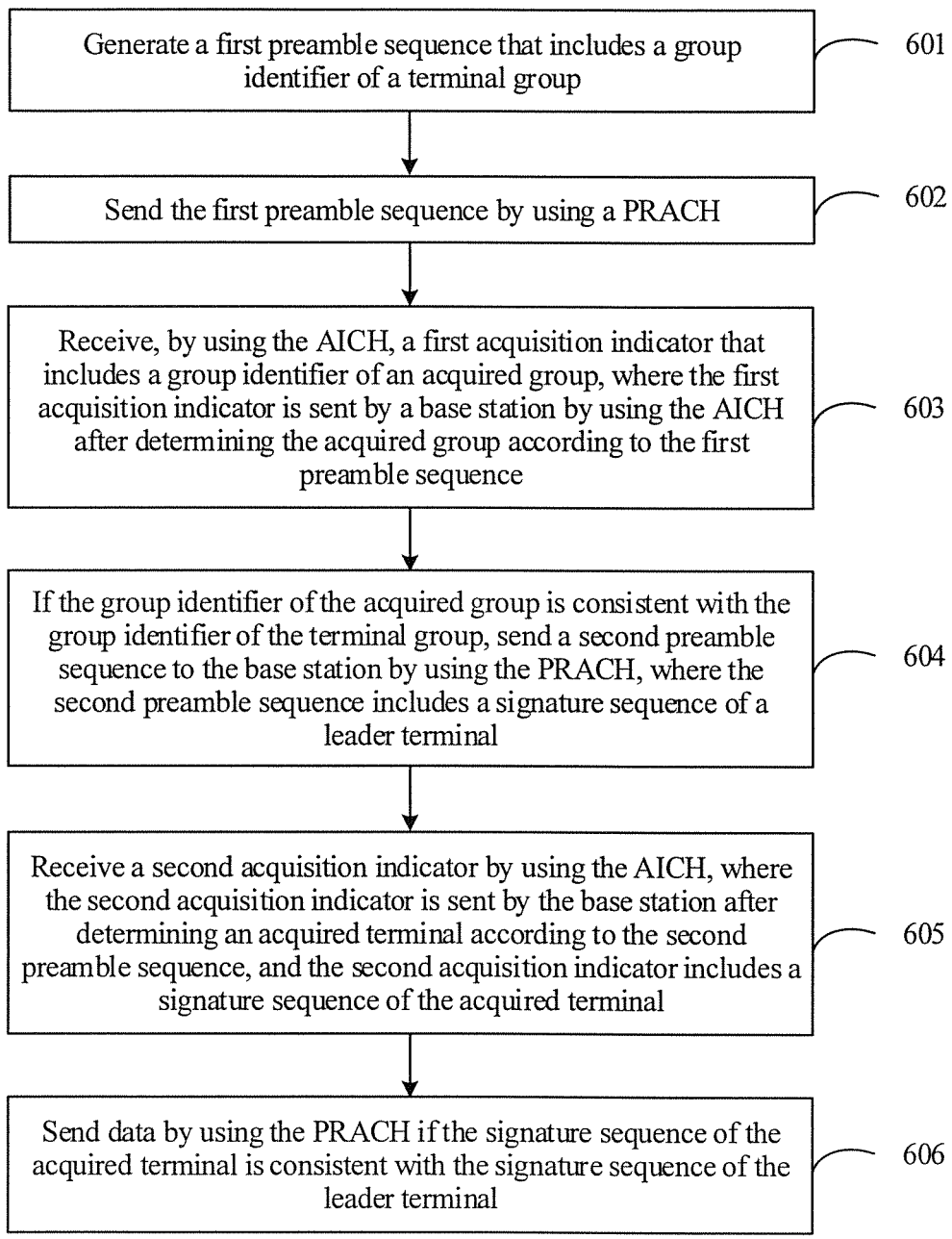
FIG. 6 is a flowchart of another embodiment of an access method according to the present invention.

Referring to FIG. 6, FIG. 6 is a flowchart of another embodiment of an access method according to the present invention, and the method includes following steps.

601. Generate a first preamble sequence that includes a group identifier of the terminal group.

602. Send the first preamble sequence by using a PRACH.

603. Receive, by using an AICH, a first acquisition indicator that includes a group identifier of an acquired group, where the first acquisition indicator is sent by a base station by using the AICH after determining the acquired group according to the first preamble sequence.

604. If the group identifier of the acquired group is consistent with the group identifier of the terminal group, send a second preamble sequence to the base station by using the PRACH, where the second preamble sequence includes a signature sequence of the leader terminal.

If the group identifier of the acquired group is inconsistent with the group identifier of the terminal group, it indicates that in a current data transmission slot, a terminal in the terminal group cannot transmit data. In this case, the leader terminal needs to send the first preamble sequence again, to contend for an access resource for the terminal in the terminal group.

To improve a success rate of access resource contention, when sending the first preamble sequence again, the leader terminal may increase transmit power of the first preamble sequence. The leader terminal may continuously increase the transmit power and repeatedly send the first preamble sequence, until the group identifier of the acquired group is consistent with the group identifier of the terminal group or a maximum allowed quantity of transmission times is reached.

It should be noted herein that a sending time interval t for sending the first preamble sequence twice by the leader terminal needs to be greater than or equal to a sending time interval $t_{P_p\text{-}P_p}$ for sending preamble sequences that is specified in a protocol in an existing PRACH process. That is, $t_{P_p\text{-}P_p} \geq t_{p\text{-}p,min}$.

605. Receive a second acquisition indicator by using the AICH, where the second acquisition indicator is sent by the base station after determining an acquired terminal according to the second preamble sequence, and the second acquisition indicator includes a signature sequence of the acquired terminal.

606. Send data by using the PRACH if the signature sequence of the acquired terminal is consistent with the signature sequence of the leader terminal.

According to this embodiment, a process of contending for an access resource by a terminal transforms from one-phase contention to two-phase contention. Therefore, a quantity of preamble sequences received by a base station can be greatly reduced, thereby effectively reducing load of the base station. In addition, for each member terminal, if a quantity of preamble sequence sending times is reduced, energy consumed in a data transmission process can also be reduced.

Figure 7:
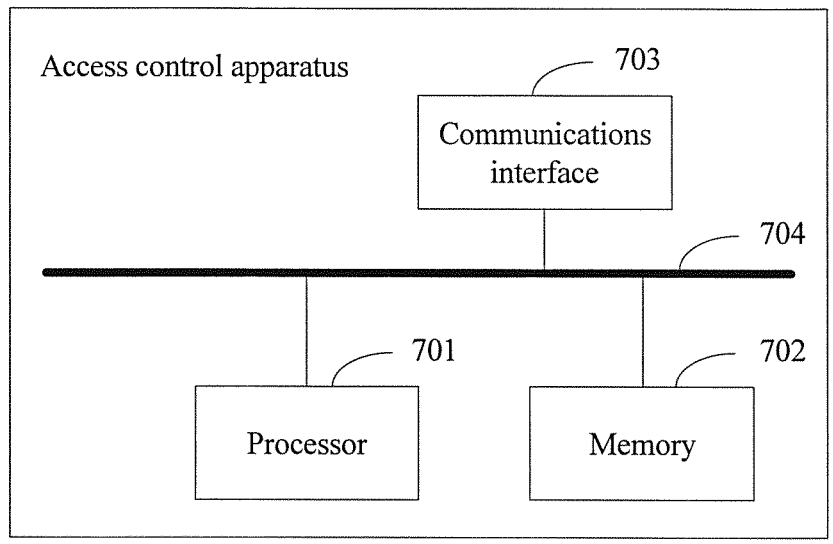
FIG. 7 is a schematic diagram of another embodiment of an access control apparatus according to the present invention.

Referring to FIG. 7, FIG. 7 is a schematic diagram of another embodiment of an access control apparatus according to the present invention.

As shown in FIG. 7, the apparatus includes a processor 701, a memory 702, and a communications interface 703, where the processor 701, the memory 702, and the communications interface 703 are connected by using a bus 704.

The bus 704 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used in FIG. 7 for representation; however, it does not indicate that there is only one bus or only one type of bus.

The memory 702 is configured to store a program. Specifically, the program may include a program code, where the program code includes a computer operation instruction. The memory 702 may include a Random Access Memory (RAM), or may further include a non-volatile memory (Non-Volatile Memory) such as at least one disk memory.

The processor 701 executes the program stored in the memory 702, and is configured to: receive, by using the communications interface 703, a first preamble sequence sent by a leader terminal in a terminal group; determine an acquired-terminal group according to the first preamble sequence; send, by using the communications interface 703, a first acquisition indicator to a terminal in the acquired-terminal group; receive, by using the communications interface 703, a second preamble sequence that is sent by a terminal in the terminal group after receiving the first acquisition indicator; determine an acquired terminal according to the second preamble sequence; and send, by using the communications interface 703, a second acquisition indicator to the acquired terminal, where the second acquisition indicator is used to indicate access of the acquired terminal.

In another optional implementation manner, the receiving, by using the communications interface 703, a first preamble sequence sent by a leader terminal in a terminal group includes: receiving, by using the communications interface 703, the first preamble sequence that is sent by the leader terminal by using a physical random access channel PRACH and that includes a group identifier of the terminal group.

In another optional implementation manner, the sending, by using the communications interface 703, a first acquisition indicator to a terminal in the acquired-terminal group includes: sending, by using the communications interface 703, the first acquisition indicator that includes a group identifier of the acquired group by using an acquisition indicator channel AICH.

In another optional implementation manner, the receiving, by using the communications interface 703, a second preamble sequence that is sent by a terminal in the acquired-terminal group after receiving the first acquisition indicator includes: receiving, by using the communications interface 703, the second preamble sequence that is sent by the terminal in the acquired group by using the PRACH after receiving the first acquisition indicator and that includes a signature sequence of the terminal.

In another optional implementation manner, the sending, by using the communications interface 703, a second acquisition indicator to the acquired terminal includes: sending, by using the communications interface 703, the second acquisition indicator that includes a signature sequence of the acquired terminal by using the AICH.

Figure 8:
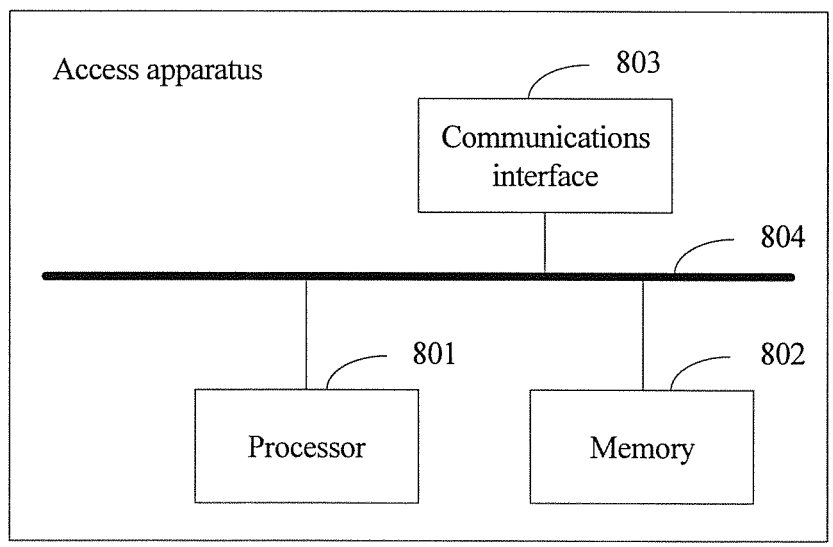
FIG. 8 is a schematic diagram of another embodiment of an access apparatus according to the present invention.

Referring to FIG. 8, FIG. 8 is a schematic diagram of another embodiment of an access apparatus according to the present invention.

As shown in FIG. 8, the apparatus includes a processor 801, a memory 802, and a communications interface 803, where the processor 801, the memory 802, and the communications interface 803 are connected by using a bus 804.

The bus 804 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used in FIG. 6 for representation; however, it does not indicate that there is only one bus or only one type of bus.

The memory 802 is configured to store a program. Specifically, the program may include a program code, where the program code includes a computer operation instruction. The memory 802 may include a Random Access Memory (RAM), or may further include a non-volatile memory (Non-Volatile Memory), for example, at least one disk memory.

The processor 801 executes the program stored in the memory 802, and is configured to: receive, by using the communications interface 803, a first acquisition indicator that is sent by a base station and that includes a group identifier of an acquired group; send, by using the communications interface 803, a second preamble sequence that includes a signature sequence of a terminal to the base station if the group identifier of the acquired group is consistent with a group identifier of a terminal group in which the terminal is located; receive, by using the communications interface 803, a second acquisition indicator that is sent by the base station after determining an acquired terminal according to the second preamble sequence and that includes a signature sequence of the acquired terminal; and send, by using the communications interface 803, data to the base station if the signature sequence of the acquired terminal is consistent with the signature sequence of the terminal.

In another optional implementation manner, the receiving, by using the communications interface 803, a first acquisition indicator that is sent by a base station and that includes a group identifier of an acquired group includes: receiving, by using the communications interface 803, the first acquisition indicator by using an acquisition indicator channel AICH, where the first acquisition indicator is sent by the base station after determining the acquired group according to a first preamble sequence, and the first preamble sequence is sent by a leader terminal in the terminal group by using a physical random access channel PRACH.

In another optional implementation manner, before the receiving, by using the communications interface 803, a first acquisition indicator that is sent by a base station and that includes a group identifier of an acquired group, the method further includes: generating the first preamble sequence that includes the group identifier of the terminal group; and sending, by using the communications interface 803, the first preamble sequence by using the PRACH. And the receiving, by using the communications interface 803, a first acquisition indicator that is sent by a base station and that includes a group identifier of an acquired group includes: receiving, by using the communications interface 803, the first acquisition indicator by using the AICH, where the first acquisition indicator is sent by the base station after determining the acquired group according to the first preamble sequence.

In another optional implementation manner, the generating the first preamble sequence that includes the group identifier of the terminal group includes: determining the group identifier of the terminal group and the signature sequence of the terminal, wherein the group identifier of the terminal group is a Hadamard sequence of a preset length; and generating the first preamble sequence comprising the group identifier of the terminal group and the signature sequence of the terminal.

In another optional implementation manner, the processor 801 is further configured to re-send the first preamble sequence to the base station if the signature sequence of the acquired terminal is inconsistent with the signature sequence of the terminal.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product may be stored in a storage medium, such as a ROM/RAM, a hard disk, or an optical disc, and includes several instructions for enabling a computer device (which may be a personal computer, a server, a network device or the like) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. An access control apparatus, comprising:
   a processor; and
   a memory, coupled to the processor and configured to store computer executable program code comprising an instruction, and when the processor executes the instruction, the instruction enables the apparatus to perform the following operations:
      receiving a first preamble sequence from a leader terminal in a terminal group, wherein the terminal group comprises the leader terminal and at least one member terminal, and the leader terminal is a terminal, selected from the terminals in the terminal group, contending for an access resource for the terminal group,
      determining the terminal group as an acquired-terminal group according to the first preamble sequence,
      sending a first acquisition indicator to terminals in the acquired-terminal group, wherein the first acquisition indicator indicates the terminals in the acquired-terminal group are allowed to further contend for the access resource,
      receiving a second preamble sequence from a first terminal, wherein the first terminal is any one of the terminals in the acquired-terminal group,
      determining the first terminal as an acquired terminal according to the second preamble sequence, and
      sending a second acquisition indicator to the acquired terminal, wherein the second acquisition indicator indicates the acquired terminal obtains the access resource to transmit data.

2. The apparatus according to claim 1, wherein the operation of receiving a first preamble sequence comprises:
   receiving the first preamble sequence that is sent by the leader terminal by using a physical random access channel (PRACH) and that comprises a group identifier of the terminal group.

3. The apparatus according to claim 2, wherein the operation of sending a first acquisition indicator comprises:
   sending, by using an acquisition indicator channel (AICH), the first acquisition indicator that comprises a group identifier of the acquired-terminal group.

4. The apparatus according to claim 2, wherein the operation of receiving a second preamble sequence comprises:
   receiving the second preamble sequence that is sent by the first terminal in the acquired group by using the PRACH after receiving the first acquisition indicator and that comprises a signature sequence of the terminal.

5. The apparatus according to claim 3, wherein the operation of sending a second acquisition indicator comprises:
   sending, by using the AICH, the second acquisition indicator that comprises a signature sequence of the acquired terminal.

6. A terminal used to contend for an access resource, comprising:
   a processor; and
   a memory, coupled to the processor and configured to store computer executable program code comprising an instruction, and when the processor executes the instruction, the instruction enables the terminal to perform the following operations:
receiving a first acquisition indicator from a base station, wherein the first acquisition indicator comprises a group identifier of an acquired-terminal group and indicates the terminals in the acquired-terminal group are allowed to further contend for the access resource,
sending a second preamble sequence that comprises a signature sequence of the terminal to the base station in response to determining that the group identifier of the acquired-terminal group is consistent with a group identifier of a terminal group to which the terminal belongs,
receiving a second acquisition indicator from the base station, wherein the second acquisition indicator comprises a signature sequence of an acquired terminal, and
sending data to the base station in response to determining that the signature sequence of the acquired terminal is consistent with the signature sequence of the terminal.

7. The apparatus according to claim 6, wherein the operation of receiving a first acquisition indicator comprises:
receiving the first acquisition indicator by using an acquisition indicator channel (AICH).

8. The apparatus according to claim 6, the operations further comprising:
generating a first preamble sequence that comprises the group identifier of the terminal group, wherein the first preamble sequence contends for the access resource for the terminal group; and
sending the first preamble sequence by using a physical random access channel (PRACH).

9. The apparatus according to claim 8, wherein the operation of generating a first preamble sequence comprises:
determining the group identifier of the terminal group and the signature sequence of the terminal, wherein the group identifier of the terminal group is a Hadamard sequence of a preset length; and
generating the first preamble sequence comprising the group identifier of the terminal group and the signature sequence of the terminal.

10. The apparatus according to claim 8, wherein the operations further comprise:
re-sending the first preamble sequence to the base station when the signature sequence of the acquired terminal is inconsistent with the signature sequence of the terminal.

11. An access control method, comprising:
receiving, by a base station, a first preamble sequence sent by a leader terminal in a terminal group, wherein the terminal group comprises the leader terminal and at least one member terminal, and the leader terminal is a terminal, selected from the terminals in the terminal group, contending for an access resource for the terminal group;
determining, by the base station, the terminal group as an acquired-terminal group according to the first preamble sequence;
sending, by the base station, a first acquisition indicator to terminals in the acquired-terminal group, wherein the first acquisition indicator indicates the terminals in the acquired-terminal group are allowed to further contend for the access resource;
receiving, by the base station, a second preamble sequence from a first terminal, wherein the first terminal is any one of the terminals in the acquired-terminal group;
determining, by the base station, the first terminal as an acquired terminal according to the second preamble sequence; and
sending, by the base station, a second acquisition indicator to the acquired terminal, wherein the second acquisition indicator indicates the acquired terminal obtains the access resource to transmit data.

12. The method according to claim 11, wherein receiving a first preamble comprises:
receiving, by the base station, the first preamble sequence that is sent by the leader terminal by using a physical random access channel (PRACH) and that comprises a group identifier of the terminal group.

13. The method according to claim 12, wherein sending a first acquisition indicator comprises:
sending, by the base station by using an acquisition indicator channel (AICH), the first acquisition indicator that comprises a group identifier of the acquired group.

14. The method according to claim 12, wherein receiving a second preamble sequence comprises:
receiving, by the base station, the second preamble sequence that is sent by the first terminal in the acquired group by using the PRACH after receiving the first acquisition indicator and that comprises a signature sequence of the terminal.

15. The method according to claim 13, wherein sending a second acquisition indicator comprises:
sending, by the base station by using the AICH, the second acquisition indicator that comprises a signature sequence of the acquired terminal.

16. An access method for contending for an access resource, the method comprising:
receiving, by a terminal, a first acquisition indicator from a base station, wherein the first acquisition indicator comprises a group identifier of an acquired-terminal group and indicates the terminals in the acquired-terminal group are allowed to further contend for the access resource;
sending, by the terminal, a second preamble sequence that comprises a signature sequence of the terminal to the base station in response to determining that the group identifier of the acquired-terminal group is consistent with a group identifier of a terminal group to which the terminal belongs;
receiving, by the a second acquisition indicator from the base station, wherein the second acquisition indicator comprises a signature sequence of the acquired terminal; and
sending, by the data to the base station in response to determining that the signature sequence of the acquired terminal is consistent with the signature sequence of the terminal.

17. The method according to claim 16, wherein receiving a first acquisition indicator comprises:
receiving, by the the first acquisition indicator by using an acquisition indicator channel (AICH).

18. The method according to claim 16, wherein:
before receiving a first acquisition indicator the method further comprises:
generating, by the terminal, a first preamble sequence that comprises the group identifier of the terminal group, wherein the first preamble sequence contends for the access resource for the terminal group, and sending the first preamble sequence by using a physical random access channel (PRACH).

19. The method according to claim 18, wherein generating the first preamble sequence comprises:
   determining, by the terminal, the group identifier of the terminal group and the signature sequence of the terminal, wherein the group identifier of the terminal group is a Hadamard sequence of a preset length; and
   generating, by the terminal, the first preamble sequence comprising the group identifier of the terminal group and the signature sequence of the terminal.

20. The method according to claim 18, further comprising:
   re-sending the first preamble sequence to the base station when the signature sequence of the acquired terminal is inconsistent with the signature sequence of the terminal.

* * * * *

UNITED STATES PATENT AND TRADEMARK OFFICE
CERTIFICATE OF CORRECTION

PATENT NO. : 10,462,728 B2  
APPLICATION NO. : 15/392879  
DATED : October 29, 2019  
INVENTOR(S) : Yueying Zhao et al.

Page 1 of 1

It is certified that error appears in the above-identified patent and that said Letters Patent is hereby corrected as shown below:

In the Claims

Claim 16, Column 20, Line 49:  
"receiving, by the a second"  
Should read:  
-- receiving, by the terminal, a second --.

Claim 16, Column 20, Line 53:  
"sending, by the data"  
Should read:  
-- sending, by the terminal, the data --.

Claim 17, Column 20, Line 59:  
"receiving, by the the"  
Should read:  
-- receiving, by the terminal, the --.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*